United States Patent [19]
Bernard et al.

[11] Patent Number: 4,710,341
[45] Date of Patent: Dec. 1, 1987

[54] APPARATUS AND METHOD FOR CLOSED-LOOP CONTROL OF REACTOR POWER

[75] Inventors: John A. Bernard, Needham Heights; Allan F. Henry, Boston, both of Mass.; David D. Lanning, Hampstead, N.H.; Kwan S. Kwok, Newtonville, Mass.

[73] Assignee: Massachusetts Institute of Technology, Cambridge, Mass.

[21] Appl. No.: 907,048

[22] Filed: Sep. 12, 1986

Related U.S. Application Data

[63] Continuation-in-part of Ser. No. 633,939, Jul. 24, 1984, Pat. No. 4,637,911.

[51] Int. Cl.$^4$ ............................................. G21C 7/36
[52] U.S. Cl. ..................................... 376/216; 376/217; 376/236
[58] Field of Search ........... 376/216, 217, 219, 236 X, 376/237, 238, 908; 364/431.01, 527, 806

[56] References Cited

U.S. PATENT DOCUMENTS

| | | | |
|---|---|---|---|
| 4,318,778 | 3/1982 | Musick | 376/216 |
| 4,400,343 | 8/1983 | Izumi et al. | 376/417 |
| 4,459,259 | 7/1984 | Colley | 376/216 |
| 4,637,911 | 1/1987 | Bernard | 376/217 |

*Primary Examiner*—Donald P. Walsh

[57] ABSTRACT

Closed-loop controller for altering the power level of nuclear reactors in a safe manner and without overshoot. Apparatus is provided for moving a control element such as a control rod or for adjusting the concentration of a soluble neutron absorber (chemical shim) for altering the nuclear reactor power level. A computer computes at short time intervals the two functions $[\rho(t) - |\dot{\rho}_c|/\lambda_e'(t)]/|\dot{\rho}_c|$ and $\tau(t)\ln(P_F/P(t))$. The direction of motion of the control element is altered when these two functions become equal thereby resulting in the attainment of a new power level without overshoot. In a preferred embodiment, these two functions are computed at intervals of approximately one second.

20 Claims, 5 Drawing Figures

SCHEMATIC OF NON-LINEAR DIGITAL CONTROLLER

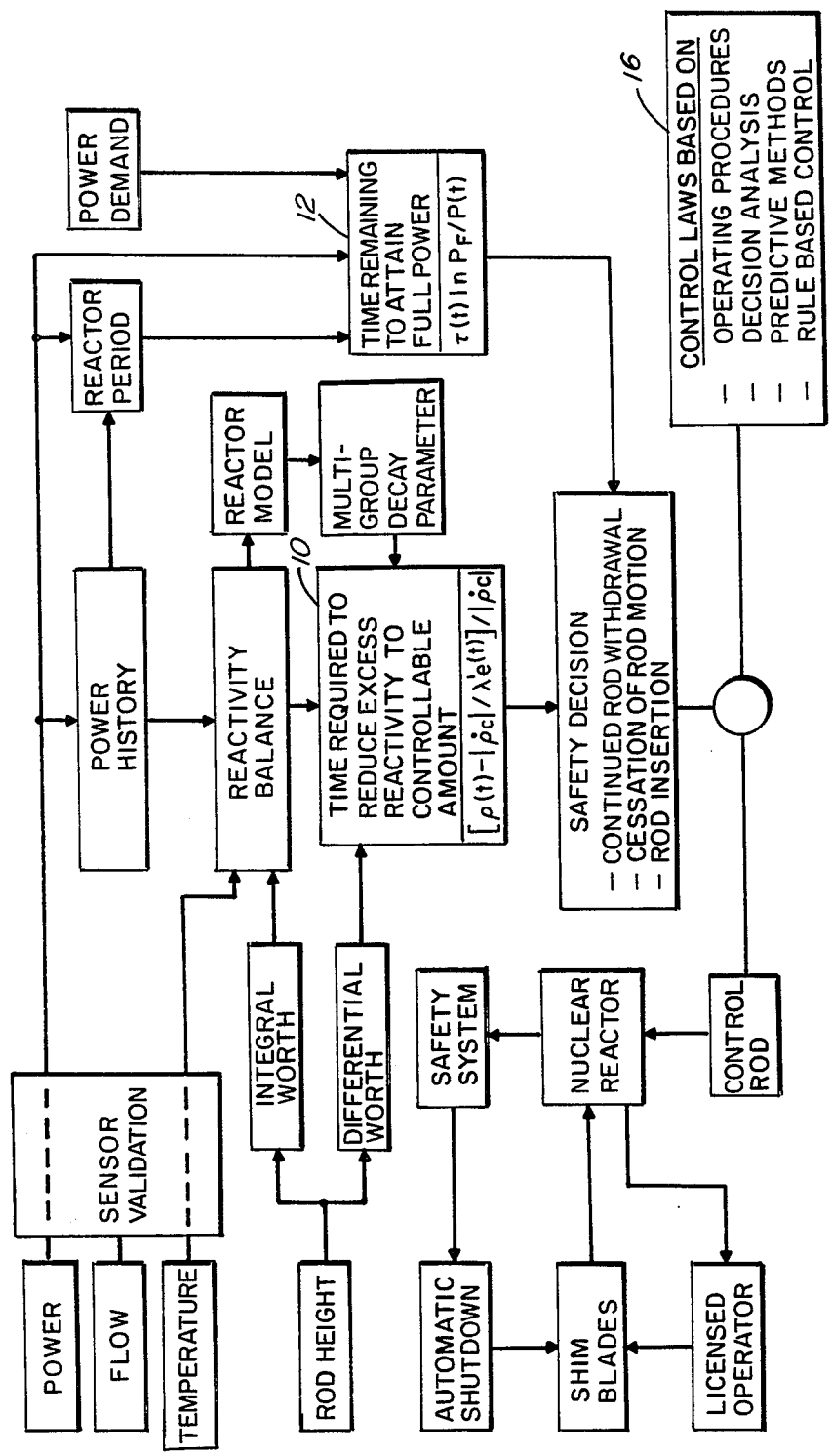
FIG. 2: SCHEMATIC OF NON-LINEAR DIGITAL CONTROLLER

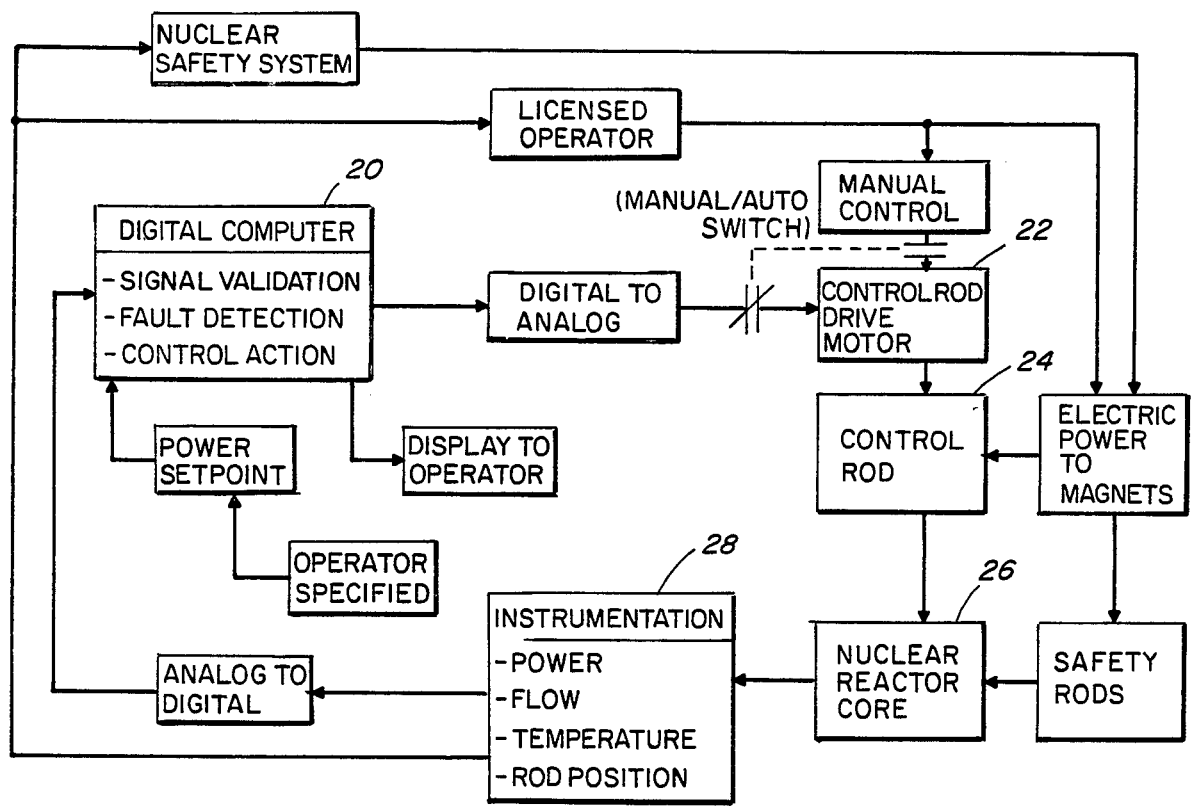
FIG. 3: SCHEMATIC ILLUSTRATION OF A PHYSICAL IMPLEMENTATION OF THE CONTROLLER
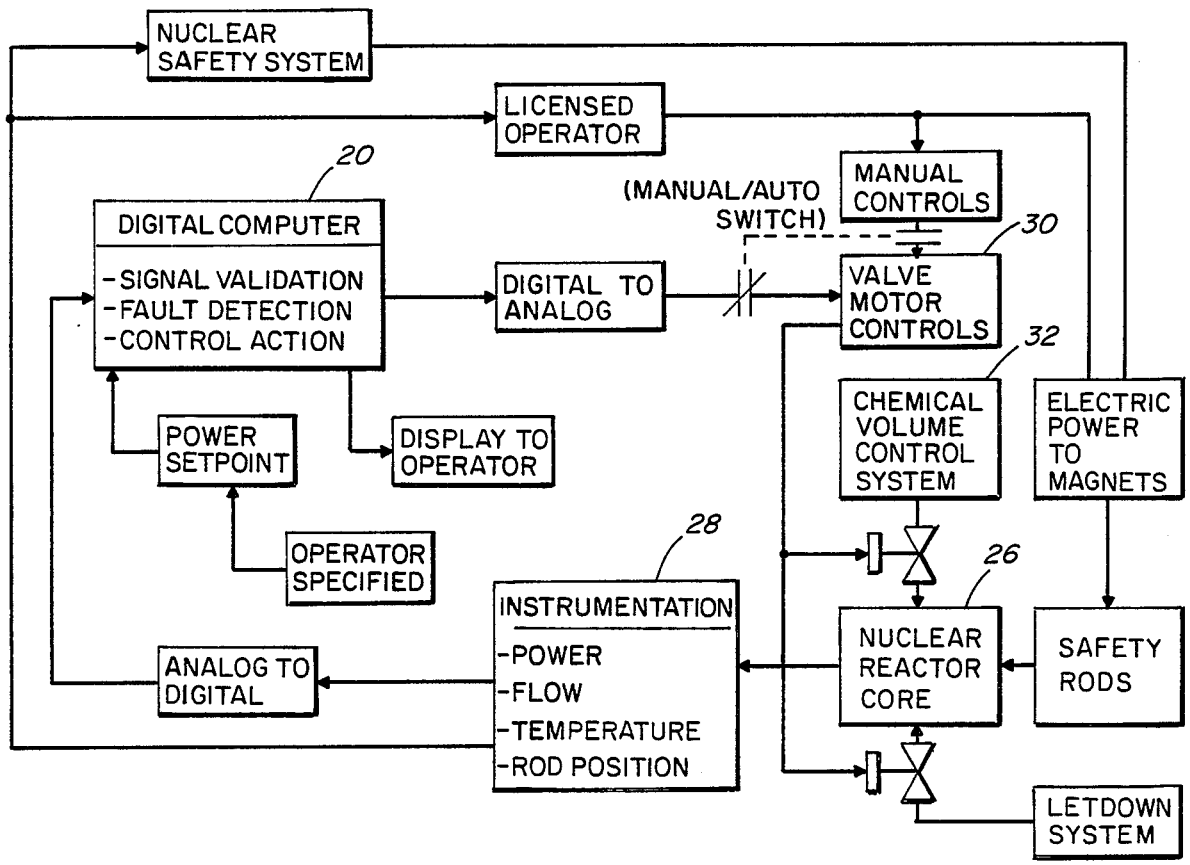
FIG. 4: SCHEMATIC ILLUSTRATION OF A PHYSICAL IMPLEMENTATION OF THE CONTROLLER

APPARATUS AND METHOD FOR CLOSED-LOOP CONTROL OF REACTOR POWER

BACKGROUND OF THE INVENTION

This is a continuation-in-part of U.S. Ser. No. 633,939 filed July 24, 1984.

This invention relates to the control of nuclear reactors and more particularly to the closed-loop control of reactor power.

To change the steady state power level of a nuclear reactor, neutron-absorbing control elements such as control rods or shim blades are moved in and out of the reactor core. Also, certain soluble chemicals may be used as the control element. For example, to increase the power of a nuclear reactor, the control rods are moved outwardly so that the neutron population can build up to a level consistent with the higher output level. Once the population has increased to the suitable level, the control rods are reinserted to their original position less the impact of feedback effects such as temperature and voids on the reactor's neutron population. Alternatively, if chemical poisons were being used, the concentration of the chemical would be decreased, the power allowed to rise, and the concentration then restored to its initial value less feedback effects. The reactor will then continue to operate at the new higher output level. Because of the nuclear reactor dynamics to be discussed in more detail below, the direction of control rod movement or the change in concentration of the chemical, such as boric acid, must be reversed before the new power level has been attained. Normally, this reversal is not accomplished as one continuous movement but in a series of short reversals interrupted by intervals in which the rod position or chemical concentration is kept constant. Once the reversal in the direction of rod travel or the change in chemical concentration has been initiated, the power may continue to build up but at a slower rate. If the change was performed properly, the power level will climb to the desired new operating level without overshoot or undershoot. At the present time decisions concerning control mechanism reversal are made by the licensed reactor operator based on knowledge of the dynamics of the reactor and the experience of the operator. These decisions are complicated because (1) the equations of reactor dynamics are non-linear, (2) the rate of change of power depends on both the net change in the control mechanism's position or concentration and its rate of change, (3) there are feedback effects between the reactor power and the rate at which power is changing, and (4) control mechanisms have non-linear strengths and finite speeds.

It is therefore an object of this invention to provide a closed-loop control system for regulating reactor power in a nuclear reactor.

It is a further object of the invention to provide such a closed-loop system which results in the attainment of new power levels without overshoot (or conversely, undershoot) beyond that allowed by specified tolerance bands.

It is yet another object of the invention to provide such a closed-loop controller which at all times restricts the net reactivity so that it is always possible to rapidly make the reactor period infinite whenever required.

Still another object of the invention is a closed-loop nuclear reactor control scheme that guarantees that no action initiated by any automatic control law or human operator will ever result in a challenge to the existing nuclear safety system provided that the decision of the control law is subject to review by the control scheme.

Yet another object of the invention is a closed-loop power controller which recognizes that reactor dynamics are non-linear, that the rate of change of reactor power depends both on the net reactivity and the rate of change reactivity, that the reactivity is dependent on the reactor power through various feedback mechanisms, and that control mechanisms have finite speeds as well as position-dependent, non-linear worths.

SUMMARY OF THE INVENTION

These and other objects of the invention are achieved by means of an automatic control system including apparatus for moving a control element such as a control rod or for changing the concentration of soluble neutron absorber (chemical shim) for altering the power level in a nuclear reactor. Motion of a control element or change in chemical concentration of the soluble absorber alters the reactivity balance of the reactor. A computer, preferably a digital computer, is provided to compute repeatedly at intervals, the two functions $[\rho(t) - |\dot{\rho}_c|/\lambda_e'(t)]/|\dot{\rho}_c|$ and $\tau(t)\ln(P_F/P(t))$. The first term is the time required to reduce whatever reactivity is present in the reactor to the amount allowed by an absolute reactivity constraint $-|\dot{\rho}_c| \leq \lambda_e'\rho \leq |\dot{\rho}_c|$. The second term is the time remaining to attain the desired power level. The control law is such that motion of the control mechanism or change in concentration of the soluble absorber is either halted or reversed when these two functions become equal. This control method results in the attainment of the new power level without overshoot (or conversely undershoot) beyond that allowed by specified tolerance bands.

BRIEF DESCRIPTION OF THE DRAWING

The invention disclosed herein will be understood better with reference to the drawing of which:

FIG. 2 is a schematic block diagram of the non-linear digital controller disclosed herein;

FIG. 3 is a schematic illustration of a physical implementation of the controller disclosed herein; and FIG. 4 is a schematic illustration of a physical implementation of the controller disclosed herein utilizing a soluble neutron absorber as the control element.

DESCRIPTION OF THE PREFERRED EMBODIMENT

Figure 1A:
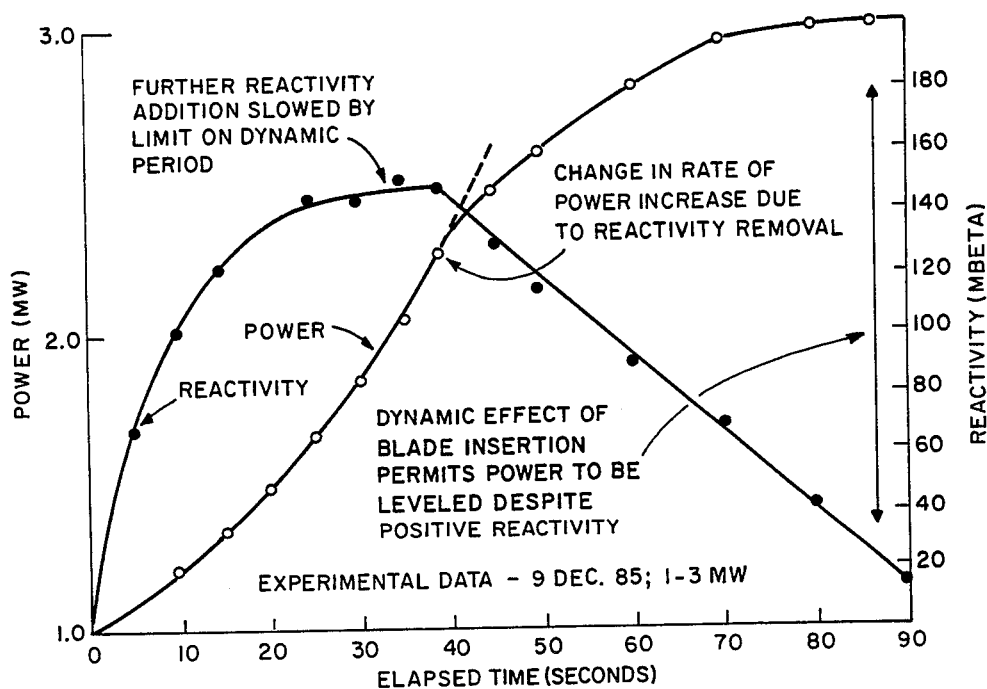
FIG. 1a is a graph showing reactivity and power trajectories for the controller disclosed herein.

As an aid to understanding the present invention, a brief discussion of the underlying theory will now be given. First of all, the non-linear digital controller disclosed herein applies to reactors that can be described by the point kinetics equations. These equations are useful for describing reactors that have either close-coupled cores or cores characterized by long mean free paths for neutron diffusion. Such reactors include research and test reactors, small to mid-size commercial reactors including modular reactors, graphite-moderated reactors, and reactors for spacecraft. Extension of the concept to large light-water reactors would involve use of the spatially-dependent kinetics equations.

The point kinetics equations are cumbersome to use for control purposes because they are written in terms of neutron and precursor concentrations, neither of which is readily measurable. Accordingly, it is more useful to combine these two point kinetics equations to obtain the alternate dynamic period equations which describe the reactor kinetics in terms of power, period, and reactivity. These equations are:

$$\tau(t) \cong \frac{\bar{\beta} - \rho(t)}{\dot{\rho}(t) + \lambda'_e(t)\rho(t) + \Sigma\bar{\beta}_i(\lambda_i - \lambda'_e(t))} \quad (1)$$

$$A(t) = \int_0^t d\sigma/\tau(\sigma)$$

$$P(t) = P_o e^{A(t)}$$

where $\tau(t)$ is the dynamic reactor period, $\bar{\beta}$ is the effective delayed neutron fraction, $\rho(t)$ is the net reactivity, $\dot{\rho}(t)$ is the rate of change of the net reactivity, $\lambda'_e(t)$ is a multi-group decay parameter, $\lambda_i$ is the decay constant of the $i^{th}$ precursor group, $P_o$ is the initial power level, and $P(t)$ is the current power level. These terms may be defined as:

(a) Period—The time required for the reactor power to increase by a factor of "e" or 2.718.

(b) Reactivity—The fractional change in the neutron population per neutron generation. (Note: The term "generation" is artificial but nevertheless useful to an initial explanation of reactivity. Neutrons are produced at high energy by fission. They must (1) decrease their energy and (2) diffuse through the reactor core before they can be absorbed in uranium and cause fissions. The time required for a neutron to complete the cycle (birth, energy decrease, diffusion, absorption) is the generation time.

(c) Asymptotic Period—The period that a reactor ultimately attains in the presence of constant reactivity. This is the period associated with the well-known inhour equation.

(d) Dynamic Period—The period that exists in the presence of changing reactivity. This is the period associated with the dynamic period equation.

(e) Reactivity Balance—Many physical phenomena may affect the reactivity. These include the control mechanisms that are used to initiate power changes, the temperature of the reactor's moderator, the temperature of the coolant, the fuel temperature, the void fraction in the coolant, and certain fission products including xenon and samarium. The effect of each of these factors can be determined by using known combinations of theoretical and empirical techniques. The total reactivity present as a function of time can be determined by summing the reactivities associated with each factor relative to some initial condition, usually an exactly critical reactor. Such a calculation is referred to as a reactivity balance.

(f) Net Reactivity—The net reactivity is the total reactivity present. This quantity is the end product of a reactivity balance calculation. (Note: Relative to the controller disclosed herein, it functions by restricting the net reactivity to that which can be controlled by altering the reactivity associated with the control mechanisms.)

(g) Multi-Group Decay Parameter—There are several types of neutrons in a nuclear reactor including prompt, delayed, and source neutrons. The generation time for the prompt ones is 100 micro-seconds. The delayed neutrons are usually characterized as belonging to one of six distinct groups. Each group has a characteristic half-life and decay constant. There are also several independent groups of source neutrons. The equations of reactor dynamics become mathematically tractable if they are written in terms of a time-dependent, multi-group decay parameter instead of different decay constants for each group of delayed and/or source neutrons. This multi-group decay parameter is a weighted average of each the delayed and source group's physical decay constant.

(h) Effective Delayed Neutron Fraction—The fraction of thermalized (low energy) neutrons that originated as delayed neutrons.

(i) Prompt Neutron—A neutron produced directly by the fission process.

(j) Delayed Neutron—A neutron produced following the radioactive decay by beta particle emission of a fission product. Fission products that undergo this process are called precursors. It is generally accepted that there are six distinct groups of precursors, one for each group of delayed neutrons.

The effective, multi-group decay parameter $\lambda'_e(t)$ is time-dependent and is defined in terms of precursor concentrations rather than precursor yields. Specifically, $$\lambda'_e(t) \equiv \sum_{i=1}^{N} \lambda_i^2 C_i(t)/\Sigma \lambda_i C_i(t) \quad (2)$$

where N is the total number of delayed and source neutron groups. This approach is desirable because the relative concentrations of the various delayed neutron precursor and source groups change depending on whether power is being increased or decreased.

One advantage to using the alternate as opposed to the standard formulation of the dynamic period equation is that the need to resort to the prompt-jump approximation is avoided. The standard formulation is given by the relations:

$$\tau(t) = \frac{\bar{\beta} - \rho(t)}{\dot{\rho}(t) + \lambda_e(t)\rho(t) + \frac{\dot{\lambda}_e(t)}{\lambda_e(t)}(\bar{\beta} \rho(t))} \quad (3)$$

$$A(t) = \int_0^t d\sigma/t(\sigma)$$

$$P(t) = P_o e^{A(t)}$$

where $\lambda_e(t)$ is defined as:

$$\lambda_e(t) \equiv \Sigma \lambda_i C_i(t)/\Sigma C_i(t)$$

The derivation of equation (3) from the point kinetics equations requires that the prompt-jump approximation be made. This means that the time derivative of the neutron population is neglected. The derivation of the alternate formulation of the dynamic period equation does not require this or any other approximation.

A reactor together with a designated control mechanism may be defined as being "feasible to control" if it is possible to transfer the system from a given power level and period to a different desired steady state power level without overshoot (or, conversely, undershoot) beyond that allowed by specified tolerance bands. Hence, not all states are allowable intermediates through which the system may pass. Excluded are states representing actual overshoots and states from which overshoots could not be averted by manipulation of the designated control mechanism. These concepts can be quantified by use of the alternate dynamic period equation, equation (1). That equation shows that control will be feasible only if the reactivity is restricted so that it is possible to terminate a power transient by reversing the direction of control mechanism motion or soluble absorber concentration and thereby making the period infinite. Control is thus feasible throughout the entire transient if an "absolute reactivity constraint" is always satisfied. That is, if, $$[\lambda_e'(t)\rho(t) + \Sigma\bar{\beta}_i(\lambda_i - \lambda_e^{40}(t))] \leq |\dot{\rho}_c| \qquad (4)$$

where $\rho(t)$ is the current value of the net reactivity and where the quantity $|\dot{\rho}_c|$ is the maximum available rate of reactivity change were the designated control mechanism to be moved or soluble absorber concentration changed. The quantity $|\dot{\rho}_c|$ is therefore always a finite positive number regardless of whether or not the control mechanism is actually moving or the soluble absorber concentration is actually changing. (Note: The term "designated" implies the means of control assigned to the closed-loop controller.)

Evaluation of the component terms of the alternate dynamic period equation shows that the third term in the denominator, which is the quantity $\Sigma\bar{\beta}_i(\lambda_i - \lambda_e')$, always opposes the reactivity change. Hence, it need not be included in the reactivity constraint. Thus, equation (4) reduces to:

$$[\lambda_e'(t)\rho(t)] \leq |\dot{\rho}_c| \qquad (5)$$

or, written for both power increases and decreases, $$-|\dot{\rho}_c| \leq \lambda_e'(t)\rho(t) \leq |\dot{\rho}_c| \qquad (6)$$

The Justification for deleting the third term in the denominator of the alternate dynamic period equation is another advantage of this approach over the use of the standard dynamic period equation as disclosed in U.S. Ser. No. 633,939. Deletion of the corresponding term, which is the quantity $(\bar{\lambda}_e/\lambda_e)(\bar{\beta}-\rho)$, from the standard form, equation (3), is less satisfactory in a theoretical sense because it depends on the observation that this term "changes sign almost immediately following a change in the direction of the control mechanism. Hence, it need not be considered in a decision on when to change that direction."

Control is said to be feasible at the desired termination point of a transient if a "sufficient reactivity constraint" is satisfied, namely, for power increases, $$[\rho(t) - |\dot{\rho}_c|/\lambda_e'(t)]/|\dot{\rho}_c| \leq \tau(t)\ln(P_F/P(t)) \qquad (7)$$

where $P_F$ and $P(t)$ are the desired and current power levels respectively, $\tau(t)$ is the shorter of either the observed or the asymptotic period corresponding to the net reactivity, $|\dot{\rho}_c|$ is the maximum available rate of change of reactivity, and $\rho(t)$ is the current value of the net reactivity. The term on the left in inequality (7) is the time required to reduce whatever reactivity is present to the amount allowed by the absolute constraint of inequality (5). The term on the right in inequality (7) is the time remaining to attain the desired power. In both inequalities (6) and (7), all quantities are time-dependent. It should be noted that, as a safety measure, the controller is programed so that the right side of (7) is to be set to zero should $P(t)$ ever exceed $P_F$. Also, for power decreases, the sufficient constraint is normally written as:

$$[\rho(t) + |\dot{\rho}_c|/\lambda_e'(t)]/|\dot{\rho}_c| \geq \tau(t)\ln(P(t)/P_F) \qquad (8)$$

The absolute reactivity constraint of inequality (6) and the sufficient reactivity constraint of inequalities (7) and (8) along with the concepts of feasibility of control as well as the concepts of available and required time form the basis for the non-linear digital controller disclosed herein. It is important to realize that if the absolute constraint is observed, control will always be feasible. Hence, by merely reversing the direction of travel of the designated control mechanism, the period can be made rapidly infinite and the power transient halted at any time during the transient. If the sufficient constraint is always observed, then by reversing the direction of control mechanism motion the power transient can be halted at the time when the desired power is reached. It should be noted that the derivation of these control relations has not required the linearization of either the equations of reactor dynamics nor the control mechanism reactivity worth curves. Also, these control relations allow for reactivity feedback effects because such effects are present in the net reactivity, $\rho(t)$.

Figure 1B:
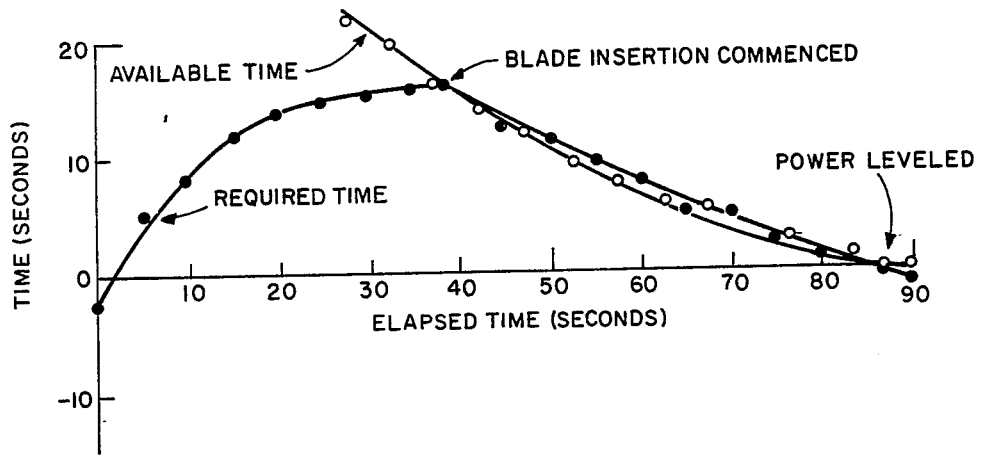
FIG. 1b is a graph of available and required times as a function of elapsed time.

FIGS. 1a and 1b show some of the results of a closed-loop control test session conducted at the Massachusetts Institute of Technology research reactor in which power was raised from 1 to 3 MW using a shim blade with a differential worth of approximately 8.15 mbeta per second (0.0064% $\Delta K/K$ per second). Shown in FIG. 1a are the reactivity and power trajectories. FIG. 1b depicts the required and available times. Note that reactivity removal was initiated (blade insertion commenced) when the required and available times became equal and that this process was begun at 2.25 MW, well in advance of attaining the desired power level of 3 MW. Another interesting feature shown in FIG. 1a is that reactor power was leveled and held constant despite the presence of positive reactivity. This was achieved by inserting the control mechanism thereby causing a negative rate of change in the prompt neutron population that was sufficient to offset the continued rise of the delayed neutrons. Finally, note that the response of the controller was quite rapid during the first 80% of the specified increase and then somewhat sluggish for the remaining 20% of the power change. This is to be expected because the magnitude of the present formulation's decay parameter is relatively large. Hence, the amount of reactivity ($|\dot{\rho}_c|/\lambda_e'$) that the controller allows to be present upon approaching full power is small. This in turn means that the controller reduces the excess reactivity early in the transient and therefore requires considerable time to complete the power change. Thus, while the overall response for this controller is reasonable and certainly comparable to that achieved under manual control, it is somewhat longer than that possible with the controller disclosed in U.S. Ser. No. 633,939. The latter, being based on the standard formulation of the dynamic period equation, has an effective multi-group, decay parameter that is approximately five times smaller than that of the present controller. Thus, the standard formulation would have allowed about 100 mbeta (0.0786% $\Delta K/K$) to be present during the final approach to power rather than the 20 mbeta (0.0157% $\Delta K/K$) that was allowed by the present controller.

FIG. 2 is a schematic diagram showing the internal structure of the non-linear digital control system disclosed herein, its relation to other control laws, and its relation to the existing nuclear safety system and to the licensed operator. It should be noted that the left side of the sufficient constraint of inequality (7) is computed at block 10 and the right side of the constraint is computed in block 12. These two values are compared in the safety decision block 14 to decide whether to permit continued rod withdrawal, to require cessation of rod motion, or to require the initiation of rod insertion. These actions alter the reactivity balance. When the two values are equal, the net reactivity is limited. Thus, the non-linear digital controller guarantees that there will be no challenge to the nuclear safety system regardless of the actual form of the control law being used. Some of the types of control laws that have been used in conjunction with the controller disclosed herein are shown in block 16.

As stated earlier in this disclosure, a prime object of this invention is a closed loop nuclear reactor control scheme that guarantees that no action initiated by any automatic control law or human operator will ever result in a challenge to the existing nuclear safety system provided that the decision of the control law is subject to a review by the control scheme. This aspect will now be discussed still in conjunction with FIG. 2. A closed-loop control law, block 16, is used to operate the reactor. The control law can be of any desired form. Alternatively, the function of block 16 may be performed by a human operator. The decision of the control law of block 16 or a human operator is reviewed in the block 14. If the function in block 10 is less than that in block 12, the block 16 controller's (or human operator's) decision is implemented. If the function in block 10 equals or exceeds that in block 12, then the decision from block 14 is to override the control law in block 16 (or human operator) and to hold the reactivity constant. If, on the next sampling, the function in block 10 still equals or exceeds the function in block 12, reactivity would be reduced. A warning may be provided rather than an actual override.

The scheme set forth in FIG. 2 thus evaluates the decisions of the associated control law or human operator to verify that no challenge will be made to the safety system as a result of implementing those decisions. This arrangement permits changes in the demanded power to be readily and safely accomplished. For example, suppose the control law were simply to move the control mechanism at a fixed speed should the deviation between the desired and actual power exceed a specified band. A power increase is desired. Initially, the reactor is at steady-state with the control law maintaining the power within the allowed deadband. Once the power set point is changed, the control law or human operator signals for withdrawal of the control rod. The reactivity constraint is initially satisfied and the withdrawal is permitted. Withdrawal continues until the constraint is no longer fulfilled. Once this occurs, blade withdrawal is halted even if the control law or human operator is signaling for its continuation. The reactor period then lengthens from its dynamic to its asymptotic value. The constraint is again satisfied and further blade withdrawal is possible. This continues until the constraint cannot be satisfied by a cessation of blade withdrawal. Blade insertion then begins. The period lengthens, the constraint is met and the blade insertion is halted until maintenance of the constraint again requires it. The net effect is that the blade is initially withdrawn continuously, then held more or less constant, and finally inserted in a stepwise fashion. Instead of overriding a human operator, block 14 of FIG. 2 might provide a warning (on a computer screen) to alert the operator to pending difficulties.

The above discussion is illustrated in FIG. 1b. At the point labeled "blade insertion commenced", the functions in block 10 and 12 of FIG. 2 have become equal. Block 16 of FIG. 2 is overruled and reactivity removal is begun.

FIG. 3 is a schematic illustration of the apparatus for effecting the control scheme outlined above. A digital computer 20 will compute the left and right sides of inequality (7) at time intervals such as one second using as inputs the parameters shown in block 28. The output of the computer 20 is used to control a motor 22 which is arranged to advance or retract a control rod 24 with respect to a reactor core 26. As discussed above, when the left and right hand sides of inequality (7) become equal, the direction of motion of the control rod 24 is altered so that a new power level is attained without overshoot (or conversely undershoot) beyond that permitted by specified tolerance bands.

FIG. 4 is substantially the same as FIG. 3 with the use of valve apparatus 30 for changing the concentration of a soluble neutron absorber (chemical shim) 32. When the left and right sides of the inequality (7) become equal, the change in the concentration of the soluble absorber (chemical shim) 32 is adjusted so that a new power level is attained as discussed above.

It is thus seen that the objects of this invention have been achieved in that there has been disclosed the apparatus and method for the closed-loop control of nuclear reactor power. The disclosed control system has resulted in a general method that guarantees that no action initiated by the automatic control system will ever result in a challenge to the existing nuclear safety systems. Furthermore, the controller is capable of raising and lowering power in a safe, efficient manner without power overshoots. It is recognized that modifications and variations will occur to those skilled in the art and it is intended tht all such modifications and variations be included within the scope of the appended claims.

What is claimed is:

1. Apparatus for closed-loop control of reactor power in a nuclear reactor in which power level is altered by adjustments in reactivity balance comprising:
   means for adjusting said reactivity balance; and
   computing apparatus for computing repeatedly at intervals the two functions $[\rho(t) - |\dot{\rho}_c|/\lambda_e'(t)]/|\dot{\rho}_c|$ and $\tau(t)\ln(P_F/P(t))$; whereby net reactivity is limited by adjusting said reactivity balance when the two functions become equal.

2. The apparatus of claim 1 wherein said means for adjusting reactivity balance includes apparatus for moving a control element.

3. The apparatus of claim 1 wherein said means for adjusting reactivity balance includes apparatus for changing the concentration of a soluble absorber (chemical shim).

4. The apparatus of claim 1 wherein said interval is of the order of one second.

5. Method for closed-loop control of reactor power in a nuclear reactor in which power level is altered by adjustments in reactivity balance comprising:

computing repeatedly at intervals the two functions $[\rho(t)-|\dot{\rho}_c|/\lambda_e'(t)]/|\dot{\rho}_c|$ and $\tau(t)\ln(P_F/P(t))$ and adjusting said reactivity balance to limit net reactivity when the two functions become equal.

6. The method of claim 5 wherein said interval is on the order of one second.

7. Apparatus for closed-loop control of reactor power in a nuclear reactor in which power level is altered by movement of a control element comprising:

apparatus for moving said control element; and computing apparatus for computing repeatedly at intervals the two functions $[\rho(t)-|\dot{\rho}_c|/\lambda_e'(t)]/|\dot{\rho}_c|$ and $\tau(t)\ln(P_F/P(t))$; whereby the direction of motion of said control element is altered when the two functions become equal.

8. Apparatus of claim 7 wherein said interval is of the order of one second.

9. Apparatus of claim 7 wherein said control element is a control rod.

10. Apparatus of claim 7 wherein said control element is a shim blade.

11. Method for closed-loop control of reactor power in a nuclear reactor in which power level is altered by movement of a control element comprising:

computing repeatedly at intervals the two functions $[\rho(t)-|\dot{\rho}_c|/\lambda_e'(t)]/|\dot{\rho}_c|$ and $\tau(t)\ln(P_F/P(t))$; and altering the direction of the motion of said control element when the two functions become equal.

12. The method of claim 11 wherein said interval is of the order of one second.

13. Apparatus for closed loop control of reactor power, in a nuclear reactor in which power level is altered by adjustment of the concentration of a soluble absorber (chemical shim) comprising:

apparatus for changing the concentration of said soluble absorber; and computing repeatedly at intervals the two functions $[\rho(t)-|\dot{\rho}_c|/\lambda_e'(t)]/|\dot{\rho}_c|$ and $\tau(t)\ln(P_F/P(t))$; whereby the concentration of said soluble absorber (chemical shim) is altered when the two functions become equal.

14. The apparatus of claim 13 wherein said interval is of the order of one second.

15. Method for closed-loop control of reactor power in a nuclear reactor in which power level is altered by adjustment of the concentration of soluble absorber (chemical shim) comprising:

computing repeatedly at internals the two functions $[\rho(t)-|\dot{\rho}_c|/\lambda_e'(t)]/|\dot{\rho}_c|$ and $\tau(t)\ln(P_F/P(t))$: and adjusting the concentration of said soluble absorber (chemical shim) when the two functions become equal.

16. The method of claim 15 wherein said interval is of the order of one second.

17. Method for control of reactor power in a nuclear reactor in which power level is altered in response to either a closed-loop control law or an open-loop decision of a human operator comprising:

computing repeatedly at intervals the two functions $[\rho(t)-|\dot{\rho}_c|/\lambda_e'(t)]/|\dot{\rho}_c|$ and $\tau(t)\ln(P_F/P(t))$ in a supervisory closed-loop controller; and overriding the decision of the closed-loop control law or the human operator by adjusting the net reactivity present in the core to avoid a power overshoot or undershoot when the two functions become equal.

18. Apparatus for control of reactor power in a nuclear reactor in which power level is altered in response to either a closed-loop control law or an open-loop decision of a human operator comprising:

a supervisory closed-loop controller adapted to compute repeatedly at intervals the two functions $[\rho(t)-|\dot{\rho}_c|/\lambda_e'(t)]/|\dot{\rho}_c|$ and $\tau(t)\ln(P_F/P(t))$, whereby the supervisory controller overrides the decision of either the closed-loop control law or the human operator by adjusting the net reactivity present in the core to avoid a power overshoot or undershoot when the two functions become equal.

19. Method for control of reactor power in a nuclear reactor in which power level is altered in response to either a closed loop control law or an open loop decision of a human operator comprising:

computing repeatedly at intervals the two functions $[\rho(t)-|\dot{\rho}_c|/\lambda_e'(t)]/|\dot{\rho}_c|$ and $\tau(t)\ln(P_F/P(t))$ in a supervisory closed loop controller; and providing a warning when the two functions become equal.

20. Apparatus for control of reactor power in a nuclear reactor in which power level is altered in response to either a closed loop control law or an open loop decision of a human operator comprising:

a supervisory closed loop controller adapted to compute repeatedly at intervals the two functions $[\rho(t)-|\dot{\rho}_c|/\lambda_e'(t)]/|\dot{\rho}_c|$ and $\tau(t)\ln(P_F/P(t))$ and to provide a warning when the two functions become equal.

* * * * *

UNITED STATES PATENT AND TRADEMARK OFFICE
CERTIFICATE OF CORRECTION

PATENT NO. : 4,710,341
DATED : December 1, 1987
INVENTOR(S) : John A. Bernard et al.

It is certified that error appears in the above-identified patent and that said Letters Patent are hereby corrected as shown below:

Column 3, line 19, "$\overset{\bullet}{\rho}(t)$" should be --$\rho(t)$-- line 20, "$\rho(t)$" should be --$\overset{\bullet}{\rho}(t)$--;

Column 5, line 16, "4o" should be --'--;

line 41, "Justification" should be --justification--;

Column 9, line 5 "$\tau(t)\ln(P_F/P(t)$" should be

--$\tau(t)\ln(P_F/P(t))$--.

Signed and Sealed this

Nineteenth Day of April, 1988

Attest:

DONALD J. QUIGG

Attesting Officer

Commissioner of Patents and Trademarks